United States Patent [19]

Barton

[11] 4,060,807
[45] Nov. 29, 1977

[54] LOW ANGLE RADAR

[75] Inventor: Paul Barton, Bishops Stortford, England

[73] Assignee: International Standard Electric Corporation, New York, N.Y.

[21] Appl. No.: 770,404

[22] Filed: Feb. 22, 1977

[30] Foreign Application Priority Data

Feb. 24, 1976 United Kingdom ............... 07210/76

[51] Int. Cl.² ............................................... G01S 7/28
[52] U.S. Cl. .............................. 343/17.1 R; 343/16 R
[58] Field of Search ......................... 343/16 R, 17.1 R

[56] References Cited

U.S. PATENT DOCUMENTS 3,099,833  7/1963  Tucker et al. ..................... 343/16 R
3,924,236  12/1975  Earp et al. ........................ 343/16 R Primary Examiner—T.H. Tubbesing
Attorney, Agent, or Firm—William T. O'Neil

[57] ABSTRACT

A receiving arrangement for a pulse radar tracker facilitating low elevation angle tracking. The received signals are sampled along the focal plane of the receiving antenna system aperture. Range gating at IF and delay line serialization are provided to generate a simulated (synthetic) scan of the aforementioned aperture plane in the form of a coherent signal waveform. The main lobe of a multipath (ground reflection in the elevation case) is substantially eliminated by the time gating and filtering is provided to greatly reduce the corresponding sidebands. Desired (direct) received signals are substantially unaffected.

7 Claims, 15 Drawing Figures

LOW ANGLE RADAR

BACKGROUND OF THE INVENTION

1. Field of the Invention

This invention relates to radar generally and, more specifically, to receiver systems for pulse radar providing beam angle discrimination.

2. Description of the Prior Art

Many operational tracking radars work on the principle of "simultaneous lobing" or "monopulse". By assuming that the radar antenna is a parabolic dish, and restricting attention to elevation angle measurements, the principle can be outlined as follows. The target is illuminated by a single transmit beam along the axis of the parabola. On reception, the signal is picked up by two antenna elements (horns, for example) on the focal plane displaced either side of the axis. A balance between echo signals received on these two elements indicate that the antenna, as a whole, is pointing directly at the target, since the two horns are equally (symmetrically) illuminated. This is brought about by forming the difference Δ between the two signals and also the sum Σ of the signals, and then providing an output to Δ/Σ (difference/sum ratio), indication of the pointing error which is (ideally) independent of absolute amplitude. From this error signal, a control loop can be operated to mechanically adjust the pointing angle of the dish so that the difference signal reduces to zero, the arrangement then being called a tracker.

With targets well above the horizontal, it is possible to achieve very high accuracies with this approach, however, conventional monopulse trackers experience problems when attempting to follow a low flying target accurately and without instability. In such a low angle situation, the image of the target return caused by ground reflection interferes severely with the direct return and results in a rapid degradation of performance below one beamwidth elevation (typically one degree) leading to loss of reliable data below about 0.5 beamwidth elevation. In the latter condition, tracking instability occurs because the pointing angle can alternate between that corresponding approximately to the image and that of the target.

Another factor is that the lowest angles often occur at the longest target ranges when signal above noise is at a premium. Known techniques for improving angular resolution often involved a large "expenditure" of signal-to-noise ratio. Further, the elevation lobing of the transmitting pattern (caused again by ground reflection) can significantly reduce the power on target, sometimes resulting in a near-nulling (phase cancellation) of the illumination.

In consideration of the aforementioned state of this art, it may be said to be an object of the invention to reduce the overall power budget degradation at low angles while still enabling the angular resolution and accuracy to be maintained at a high level.

According to the invention, there is provided a receiving system for a pulse radar system comprising range gate controlled means for simultaneously sampling the return signal distribution across a predetermined portion of the receiving aperture, apparatus for combining these samples to produce a coherent signal waveform corresponding to a time scan of the return signal distribution across that predetermined portion of aperture and having a signal spectrum which is representative of the aperture distribution, and also means for filtering the received waveform so as to attenuate the edges of the signal spectrum.

The invention will be better understood from the following detailed description made in conjunction with the accompanying drawings.

DESCRIPTION OF THE PREFERRED EMBODIMENT

Although the complete elevation system will be understood to be workable in either of two modes — fixed pointing angle at low elevation and movable pointing angle over the balance of the coverage sector — this description is concerned only with the first mode.

Figure 1:
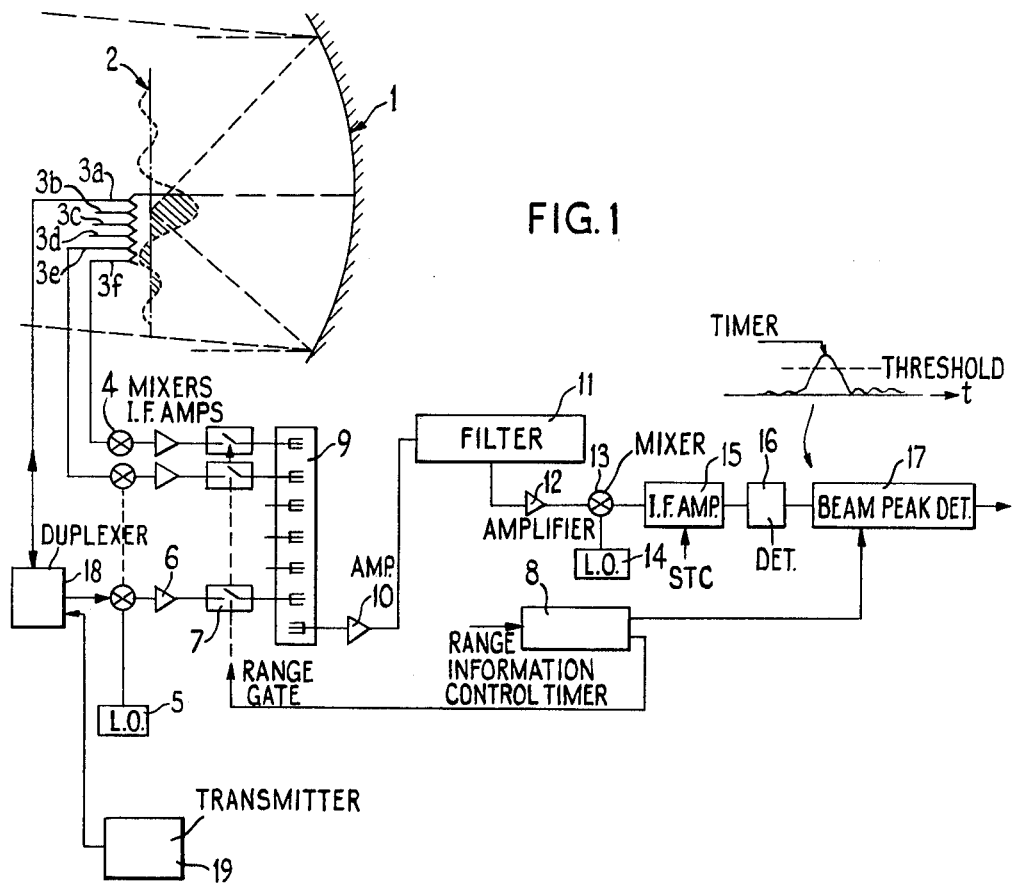
FIG. 1 is a schematic block diagram of a pulse radar low angle tracker, according to the invention.

Referring now to FIG. 1, a typical parabolic dish 1 is arranged for operation at a fixed pointing angle for the lowest extreme of coverage (0 to 1 beamwidth elevation). This offers the advantage that the beam axis can point upwards (typically at 0.7 beamwidth elevation) thus providing the steepest edge of its radiation pattern around 0° elevation. This of itself significantly reduces the maximum depth of the lobing nulls even with 100% ground reflections.

Integral with the dish (reflector), and located along a small length of the focal plane 2 of the dish, are six horns 3*a* through 3*f*, spaced at 0.5 beamwidth with their centers at positions corresponding to pointing angles of ¼, ¾ ... 11/4 beamwidths, the top horn 3*a* being located closest to the dish axis.

Pulse transmission is via this top horn or horns when coupled to a suitable RF pulse generating arrangement (transmitter) 19 through duplexer 18 (for example).

For implementation of received signal processing, each of the six horns is coupled to an RF front end mixer, typically 4, and these six mixers are also driven in parallel from a common local oscillator 5, operating at a frequency such as to produce mixer output IF frequencies of about 100 MHz, for example.

The six first IF signals are amplified via individual amplifiers 6 to an extent which allows them to be applied via individual range gates 7 simultaneously enabled from a range information control timer 8, to corresponding input taps of a delay line 9 (typically of the surface acoustic wave type), without significant degradation of the system noise figure.

The delay line inputs are spaced by a defined amount (typically 1 μ sec.) which approximately equals the radar pulse duration, but more importantly, this delay is an integral number of IF cycles. This is necessary to maintain the total path lengths between the inputs constant to within about 10 phase degrees.

The output signal from the delay line 9 is an apparent or synthetic scan of part of the focal plane 2, the signals comprising the total return signal having actually been formed simultaneously at the focal plane. The nature of the waveform obtained is such that the relative amplitude and phases of the six contributions spread out in time as they would be in an actual scan and are impressed on the IF "carrier", the signal spectrum being a valid representation of the aperture distribution.

A signal of this type, where time elapsed from a reference starting time is a measure of angle, is effectively coherent, and enhanced performance at low elevations can be obtained by subjecting the time scan to a cascade of time and frequency "gating" processes, before the final measurement is enacted.

In the case being considered, time gating has effectively been applied at the focal plane, because the position of the top horn defining the bottom limit of the apparent scan (due to inversion in the reflecting dish) fixes the extent of angular coverage.

"Time gating" the apparent scan of angular space as just described is not to be confused with the function of "range gating", the latter being to isolate in time the desired target returns from noise and clutter (and possibly other targets) as is well understood in this art.

The desired target return and its image due to ground reflections at low angles appear almost coincident in time and the undesired component cannot therefore be rejected by a range gate. For example, the time delay of the ground reflection may be approximately 0.1 nanoseconds for a target elevation angle of 0.25 degrees and with a radar aperture's phase center height of 10 feet above the horizontal plane.

The effect of the time gating (corresponding directly to sector limitation) is most readily explained by considering separately two received signals, together constituting the total received signal, where one signal is the desired signal with its main beam inside the focal plane sector covered by the horns, i.e. inside the "time gate", and the other signal is a ground reflected signal with its main beam centered below the desired angular coverage limit.

Figure 2:
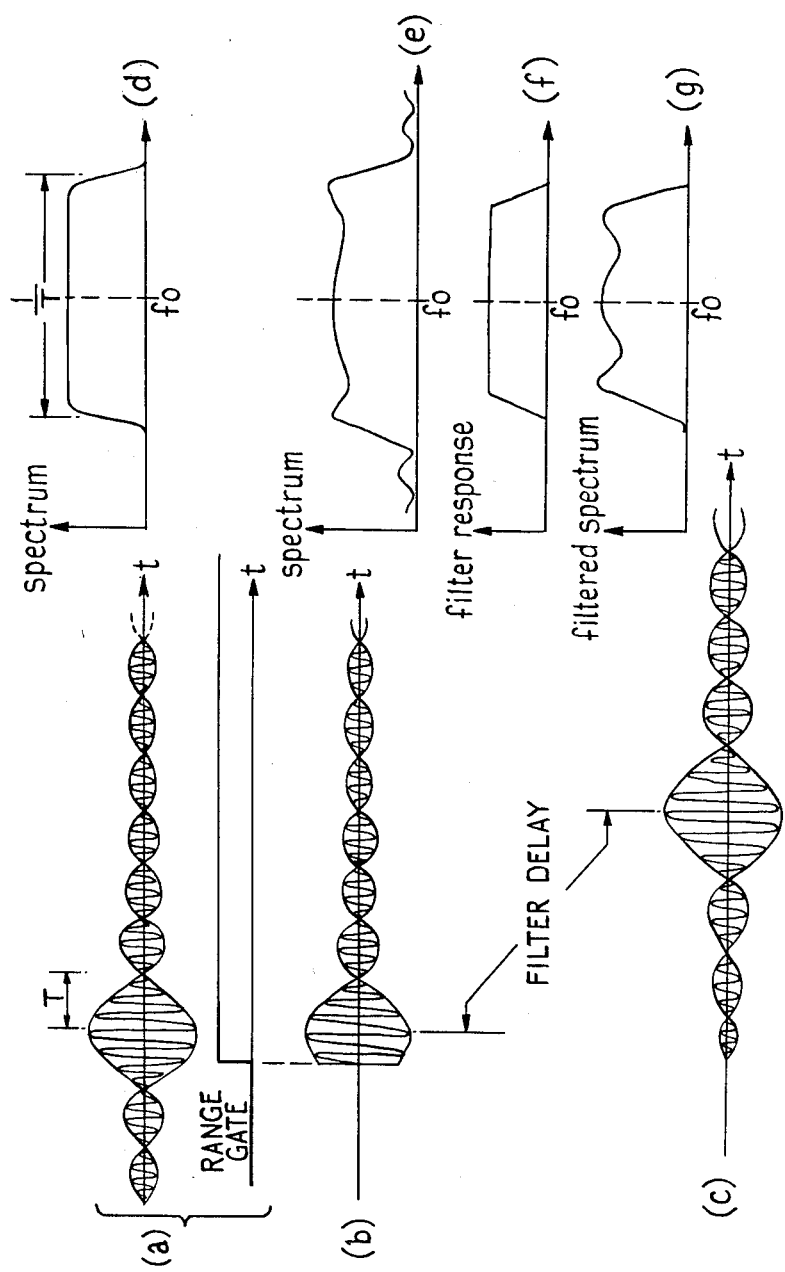
FIGS. 2 (*a* through *g*) and 3 (*a* through *g*) show received signal waveforms at various stages of the receiver processing in the arrangement of FIG. 1.

FIG. 2 shows the time modulated waveform of the desired signal, with spectrum occupancy distributed evenly across the bandwidth determined by the intertap spacing of the delay line. This even spectrum occupancy is not significantly affected by the sector/time gate.

Figure 3:
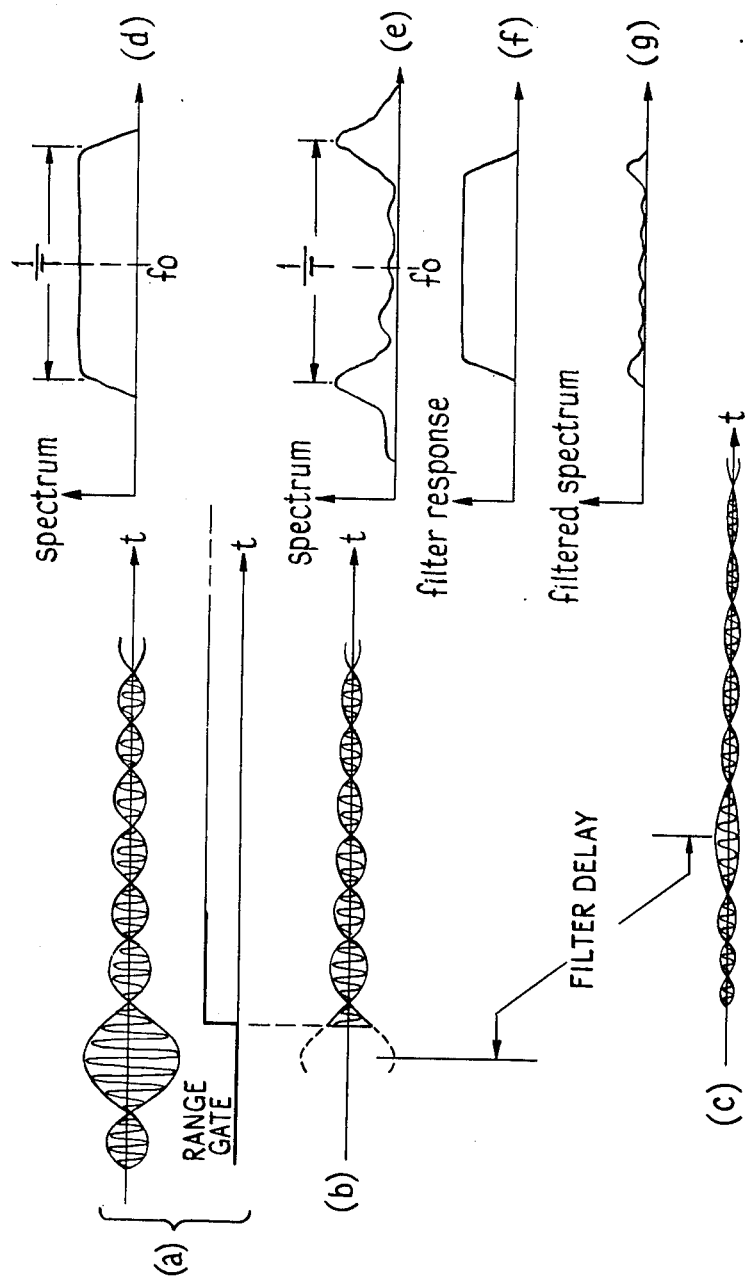

With the undesired signal however (FIG. 3), "time gating" is effective to inhibit the signal in respect of confining the majority of the spectrum to the edges of the bandwidth.

Thus, a filter which rejects or attenuates the edges of the band while passing the central region will only marginally reduce the total signal spectrum of the desired signal, but will greatly reduce the total signal spectrum contribution of the residual sidelobes of the undesired signal.

This "frequency gating" is implemented, after amplification of the time-scan waveform from the delay line 9 by an amplifier 10, by a filter 11 (typically of the surface acoustic wave transversed type) with a total passband of about 0.6/T Hz, where T is the intertap spacing of the delay line.

The time waveform which emerges from the filter 11 containing the filtered desired signal is similar in form to that applied to the filter. The main beam is broader but only marginally so, corresponding to the inevitable but minimal restriction in the information bandwidth caused by the filter. There is a relatively large delay term brought about by the filter characteristic; however, this delay can be readily calibrated out.

Subsequent to the filter, there is amplification of the signal by an amplifier 12, a second down conversion at a mixer 13 coupled to a local oscillator 14 to a second IF of about 10 MHz. Further amplification is provided in an IF amplifier 15 with sensitivity time control applied.

The signal is detected by a detector 16 and the time of peak response with respect to the range gate applied at the inputs of the delay line is measured by a beam peak detector (beam threshold and timing circuit) 17. Devices of the type of 17 have been instrumented in various forms known to those of skill in this art.

The block 8 will be recognized as a range tracking component as understood in this art.

Inclusion of moving target indication (MTI) is compatible with the system, and could be included (for example) in the second IF chain.

A number of variations will suggest themselves once the invention is understood. For one, the delay line and associated circuitry may be replaced by multiple "zero IF" receivers yielding cosine (I) and sine (Q) values for the signal from each horn, an apparent scan of the focal plane being formed by analog multiplexing of these I and Q signals, a pair from each receiver. This alternative arrangement is described in U.S. patent application, Ser. No. 707,844 filed July 22, 1976, now U.S. Pat. No. 4,034,376, assigned to the assignee of the present application.

Because the receiving process can determine accurately the target position from its own apparent scan of space, it is not necessary to couple the pointing angle of the transmitting beam to that of the low angle target. Because of this, the transmitting beam can be positioned such that the worst case lobing, for example at 0.2 beamwidths elevation, results in only 7dB loss.

It is to be understood that the foregoing description of specific examples of this invention is made by way of example only and is not to be considered as a limitation on the scope of the inventive concepts.

What is claimed is:

1. A receiving system for a pulse radar system comprising:
    range gate controlled means for simultaneously sampling the return signal distribution across a predetermined portion of the receiving aperture;
    means for combining in time distributed order, said combined samples producing a coherent signal waveform corresponding to a time scan of the received signal distribution across said predetermined aperture portion and having a signal spectrum which is representative of said aperture distribution;
    and means for filtering said waveform such as to attenuate the edges of the signal spectrum.

2. Apparatus according to claim 1 including a parabolic refelector and in which said sampling means comprise a plurality of antenna elements located at the focal plane of the reflector and extending on one side of the axis of said reflector.

3. Apparatus according to claim 1 in which said combining means comprise individual mixers for each of said samples, a common local oscillator driving said mixers, and a delay line having an individual input for each mixer output and arranged to provide a delay between successive inputs equal to an integral number of cycles of said mixers' output frequency.

4. Apparatus according to claim 2 in which said combining means comprise individual mixers for each of said samples, a common local oscillator driving said mixers, and a delay line having an individual input for each mixer output and arranged to provide a delay between successive inputs equal to an integral number of cycles of said mixers' output frequency.

5. Apparatus as claimed in claim 3 in which said delay line is a surface acoustic wave delay line.

6. Apparatus as claimed in claim 1 in which said filter is a surface acoustic wave transversal filter.

7. Apparatus according to claim 1 further comprising, subsequent to said filter, a second mixer with an associated second local oscillator, a detector for the output of said second mixer, and means for determining and timing the peak response of the detected signal with respect to the applied range gates.

* * * * *